2 Sheets—Sheet 1.
J. D. CUSTER.
HARVESTER RAKE.
No. 86,511.
Patented Feb. 2, 1869.
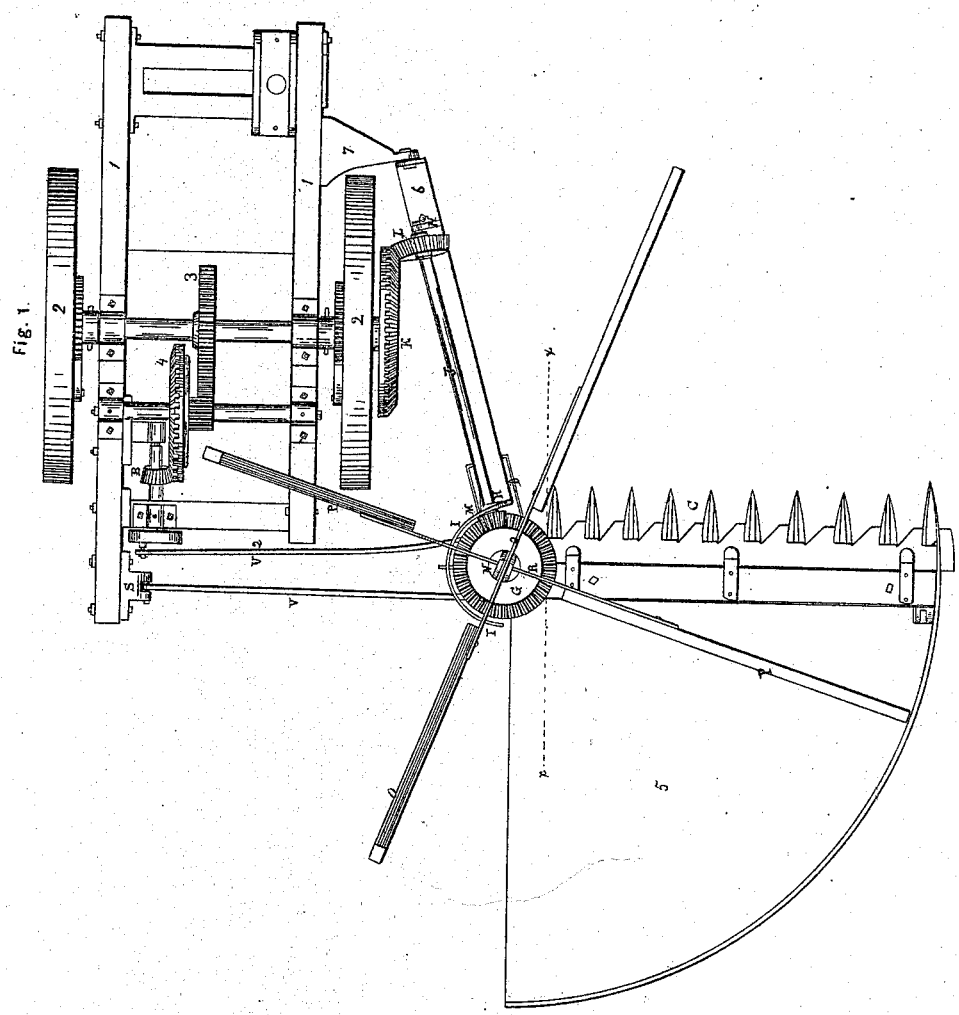
Witnesses
L. E. Corson
A. H. Corson
Inventor
J. D. Custer

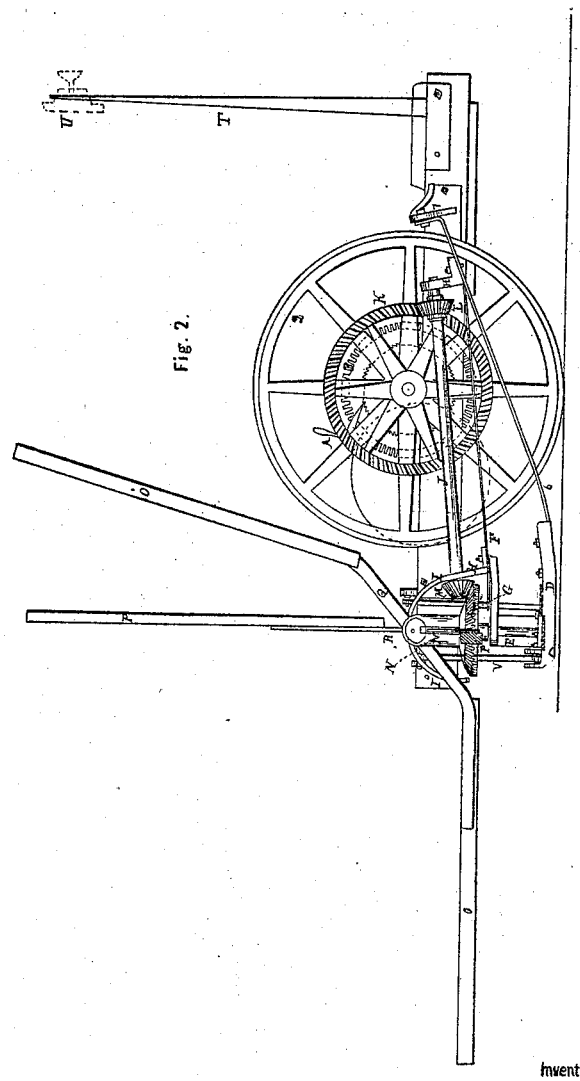

J. D. CUSTER, OF NORRISTOWN, PENNSYLVANIA.

*Letters Patent No. 86,511, dated February 2, 1869.*

IMPROVEMENT IN HARVESTER-RAKES.

The Schedule referred to in these Letters Patent and making part of the same.

*To all whom it may concern:*

Be it known that I, J. D. CUSTER, of Norristown, in the county of Montgomery, and State of Pennsylvania, have invented certain new and useful Improvements in Automatic Rakes for Harvesters; and I do hereby declare the following to be a full and exact description of the same, reference being had to the accompanying drawings, in which—

Figure 1 is a plan or top view of a harvesting-machine, embracing my improvements, and Figure 2 is a side elevation of the same, the cutting-apparatus being represented in section taken in line $x\ x$, fig. 1, with the platform removed.

Similar letters of reference denote corresponding parts in both figures.

My invention consists in a novel arrangement of the standard or support of a continuously-revolving rake and reel, and of the rake and reel-driving mechanism hereinafter explained.

In the drawings—

1 1 represent a main frame, mounted upon two main carrying and driving-wheels, 2 2, which are connected, by means of backing-ratchets, with the main axle, from which motion is communicated to the cutters through a system of gearing, represented at 3, 4, B, or in any other usual or desired manner.

6 represents a drag-bar, connected at its forward end, by a longitudinal pivot, to an arm, 7, on the main frame, and at its rear end provided with a shoe, D, rigidly connected thereto, and braced laterally, from the main frame by means of a hinged brace or coupling, V, hinged to said shoe D, and to the main frame at S.

The finger-bar is bolted to the shoe D, and has attached to it a platform, 5, the outer edge of which is provided with a rim or guard conforming to the path of the outer ends of the rake and reel-heads in sweeping over the platform.

E is a rake and reel-standard or support, the lower end or foot of which is bolted to the inner end of the finger-beam, directly over the shoe D, and which is provided, at its upper end, with a supporting-brace or plate, F, extending forward over and in front of the cutters, and connected at its forward end to the draw-bar 6. The standard E affords bearings for a rake and reel-shaft, arranged perpendicularly to the platform, or nearly so, and provided with a bevel or driving-wheel, G, and with an enlarged slotted head or hub, N, at its upper end, in which the rake and reel-arms R are pivoted in such manner as to permit a free vertical movement of said arms while rotating upon or with their vertical axis.

J is a horizontal shaft, mounted in bearings, H, on supporting-plate or brace F, and provided at its forward end with a bevel-wheel or pinion, L, which meshes with and receives its motion from a bevel-wheel, K, on the inner end of the main drive-wheel axle.

A bevel-wheel, M, on the rear end of shaft J, meshes with and drives bevel-wheel G, on the rake and reel-shaft.

I is an inclined stationary cam, attached to supporting-plate or brace F, or to the rear bearing-standard H thereon, by means of which the rising and falling movements of the continuously-revolving rake and reel-arms are controlled in the usual manner.

Having now described my invention,

What I claim as new, is—

1. Locating the standard or support of a revolving rake and reel, having a vertical axis, directly over the shoe, the base of the standard being bolted directly to the inner end of the finger-beam.

2. A combined rake and reel-standard, mounted wholly on the inner end of the finger-beam, in combination with a supporting-plate or arm, extending to the drag-bar, in front of the cutters.

3. Controlling the rising and falling movements of the continuously-revolving reel and rake-arms by a cam, mounted on a support, which is connected with the drag-bar in front, and with the shoe in rear of the cutters, in such manner as to stride the cutters and pitman.

4. Driving a revolving rake and reel, mounted upon a hinged finger-beam, by a gear-wheel attached to the inner end of the main axle, and a driving-shaft mounted on the drag-bar.

J. D. CUSTER.

Witnesses:
L. E. CORSON,
CHARLES BRIGGS.